Dec. 18, 1956  J. W. JACOBS ET AL  2,774,222
VEHICLE REFRIGERATING APPARATUS

Filed May 19, 1954  2 Sheets-Sheet 1

INVENTORS
James W. Jacobs
BY David J. Barbulesco

R. R. Condor
Their Attorney

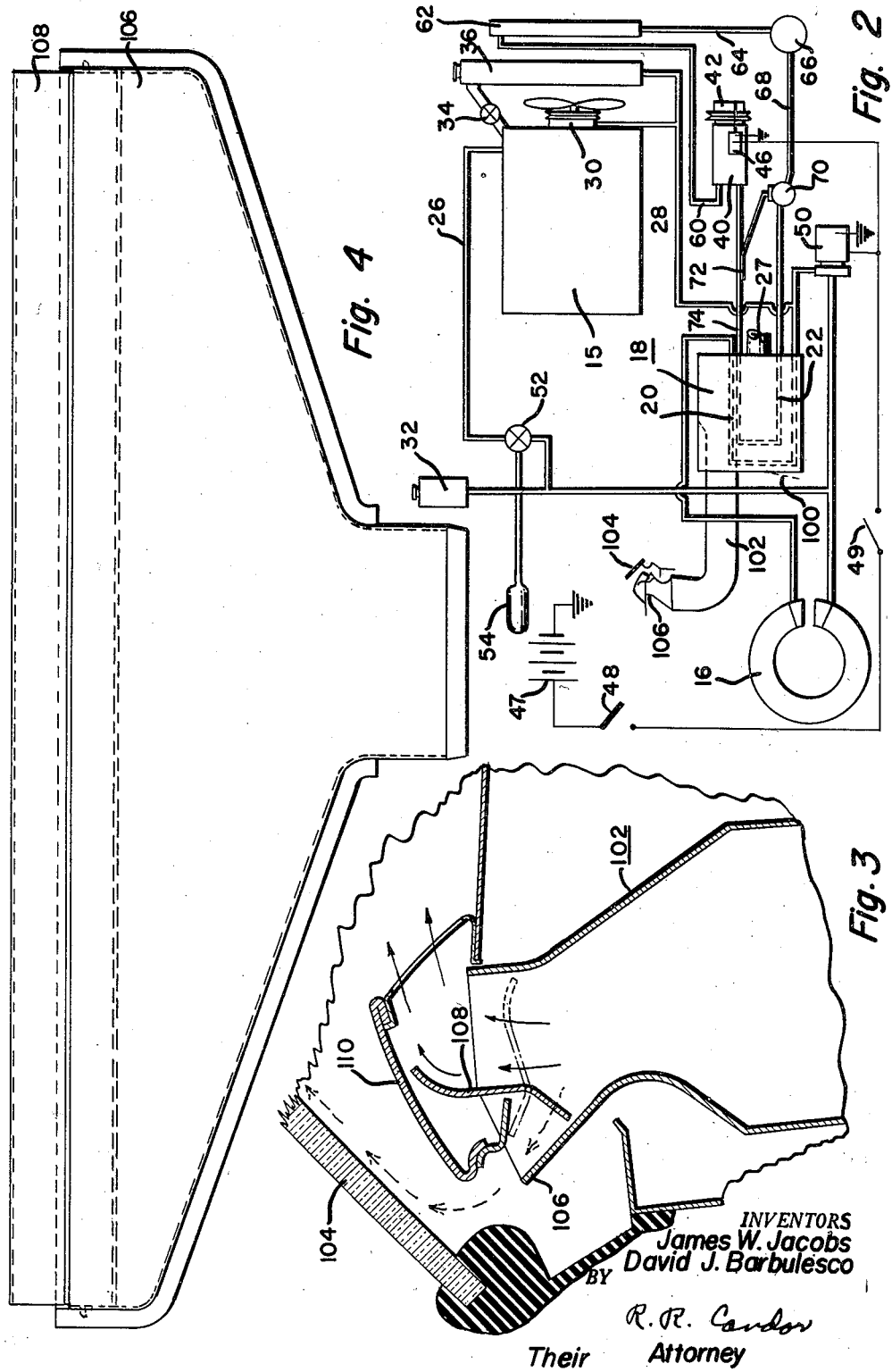

United States Patent Office 2,774,222
Patented Dec. 18, 1956

2,774,222

VEHICLE REFRIGERATING APPARATUS

James W. Jacobs and Daniel J. Barbulesco, Dayton, Ohio, assignors to General Motors Corporation, Detroit, Mich., a corporation of Delaware Application May 19, 1954, Serial No. 430,890

7 Claims. (Cl. 62—4)

This invention relates to refrigerating apparatus and more particularly to an automobile air conditioning system.

It is an object of this invention to provide a simplified automobile air conditioning system wherein the same air contacting coils may be used for either heating or cooling the air in the passenger compartment of the car. Another object of this invention is to utilize the fluid of the engine cooling system in the air conditioning system and to simplify the valving arrangement which isolates the engine cooling system from the air cooling system during summertime operation.

Another object of this invention is to provide an automobile air conditioning system using a closed volatile refrigeration circuit disposed wholly within the engine compartment of the car.

Still another object of this invention is to provide an air conditioning system in which the air to be cooled is circulated directly in thermal exchange relationship with the refrigerant evaporator and in which fluid from the engine cooling system is used for cooling air in one portion of the passenger compartment at a point remote from the evaporator.

Still another object of this invention is to provide an improved arrangement for distributing the conditioned air within the passenger compartment of the car. More particularly it is an object of this invention to provide an adjustable air deflector which enables one to use the same ducts for distributing the cooled air as are used for discharging defrost air against the windshield of a car.

Further objects and advantages of the present invention will be apparent from the following description, reference being had to the accompanying drawings, wherein a preferred form of the present invention is clearly shown.

In the drawings:

Figure 2 is a schematic view showing the refrigeration and engine cooling system used in the car;

Figure 3 is a fragmentary elevational view showing the air distributing arrangement used in the car; and, Figure 4 is a side elevational view of the air distributing duct shown in Figure 3 of the drawing.

Figure 1:
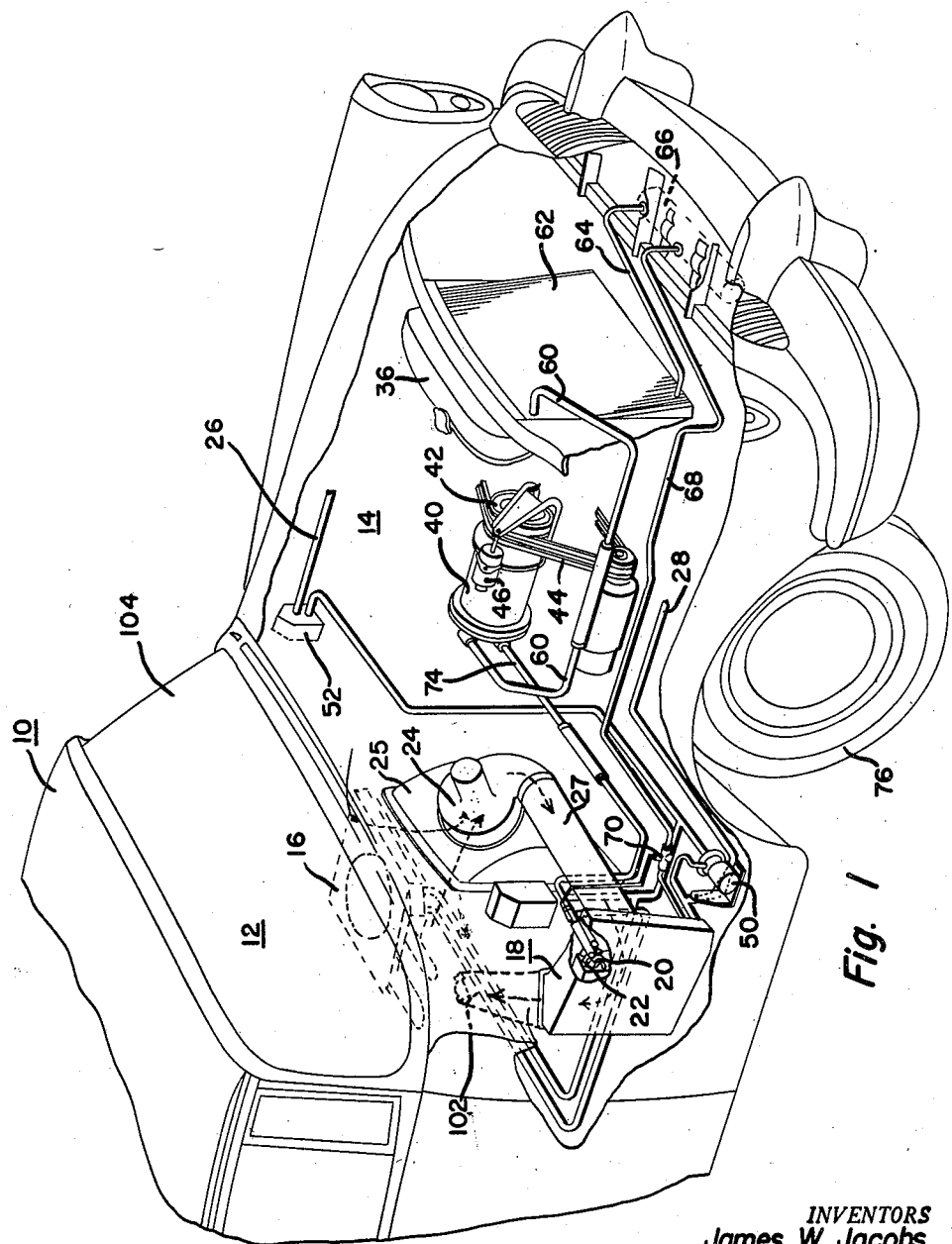
Figure 1 is a perspective view with parts broken away showing somewhat schematically the invention applied to a modern automobile.

Referring now to Figure 1 of the drawing wherein a preferred embodiment of the invention has been shown, reference numeral 10 generally designates a passenger automobile having a passenger compartment 12 and an engine compartment 14 in which the main car engine 15 (omitted in Figure 1 of the drawing for sake of clarity) is mounted in accordance with standard practice. Reference numerals 16 and 18 designate air contacting units for selectively heating or cooling air for the passenger compartment.

The unit 16 is in the form of an air contacting coil which is preferably mounted under the front seat of the automobile for either heating or cooling the air adjacent the floor of the passenger compartment. The unit 18 includes a water coil 20 and an evaporator coil 22 mounted side-by-side and both arranged to temper the air which is forcefully circulated through the unit 18 by means of a blower 24 mounted on the front side of the wall which separates the engine compartment from the passenger compartment of the car. The blower 24 is mounted on the so-called "blister" 25 into which either fresh air or air from the passenger compartment or a mixture of both is introduced in accordance with well known practice. A duct 27 connects the outlet of the fan 24 to the inlet of the unit 18. The evaporator coil 22 is arranged in thermal exchange relationship with the air circulating through the unit 18 as well as with the water coil 20. Common fins may be used for the side-by-side coils 20 and 22. For a further description of the construction and arrangement of these coils see copending application S. N. 430,891, filed May 19, 1954.

Whenever it is desired to supply heat to the passenger compartment of the car, the water coils 16 and 20 are connected to the engine cooling system by means of the water lines 26 and 28 whereby the main water pump 30 circulates hot water from the engine block to the air contacting coils 16 and 20.

For convenience of description the fluid used for cooling the engine has been referred to as water whereas in actual practice a mixture of pure water, ethylene glycol and a detergent would be used in the engine cooling system in accordance with standard practice. The term "water" as used herein is intended to include such a mixture or its equivalent.

A reservoir 32 is provided in the engine cooling system as shown in the drawing as it is contemplated that the engine cooling system will be a closed system somewhat comparable to the hydraulic brake systems now used on cars. The usual engine temperature control thermostat 34 is used for regulating the flow of water through the main engine radiator 36 in accordance with standard practice.

The air cooling equipment comprises a refrigerant compressor 40 driven from the main car engine through a clutch 42 and belts 44 which transmit power from the crankshaft of the car engine to the compressor. The clutch 42 and the controls therefor are preferably of the general type shown in copending application Serial No. 365,593, filed June 2, 1953 and Serial No. 376,606, filed August 26, 1953, now Patent No. 2,747,385, respectively.

As shown diagrammatically in Figure 2 of the drawing, the clutch is operated by a solenoid 46 which is controlled by a thermostat 48 located in the passenger compartment of the car so as to respond to the air temperature therein. The main car battery 47 supplies power for operating the clutch. Insofar as certain aspects of this invention are concerned, other types of controls could be used. The thermostat 48 not only starts and stops the compressor but also starts and stops the auxiliary water circulating pump 50 which serves to circulate water between the coils 16 and 20 when cooling is required. By opening the manual switch 49 the water pump 50 and the compressor 40 are both rendered ineffective.

A thermostatically controlled valve 52 is located in the water line 26 for controlling the car temperature during the heating cycle. This valve automatically closes at high car air temperatures. A thermo bulb 54 located in the passenger compartment of the car serves to control the valve 52 so as to admit hot water to the air contacting coils 16 and 20 only when the temperature in the passenger compartment indicates that heating rather than cooling is required. By virtue of the construction and arrangement of this control valve it is obvious that it serves the dual function of regulating the air temperature in the passenger compartment during the heating season and also serves to isolate the hot portion of the water circuit from the cold portion of the water circuit during the cooling season.

The compressor 40 is adapted to discharge compressed refrigerant through a line 60 into a condenser 62 mounted directly in front of the main car engine radiator 36. The condensed refrigerant flows through a line 64 into a receiver 66 from whence the liquid refrigerant flows through a line 68 into the evaporator 22. The flow of refrigerant through the line 68 is controlled by a thermostatic expansion valve 70 which includes the usual thermostatic bulb 72 located on the suction line 74 which conveys the vaporized refrigerant back into the compressor 40.

The air contacting water coil 16 is preferably located beneath the car seat and corresponds to the present underseat heater now commonly used on many cars while the coil 20 and the evaporator 22 are mounted in the unit 18 which is mounted in the engine compartment directly behind the right front wheel 76. By virtue of the modern car styling, the front fender extends rearwardly from the front wheel a considerable distance with the result that considerable space is available in the rear portion of the front fender and it is in this space that the unit 18 is located. This space is in effect a continuation of the engine compartment in that it is not separated from the engine compartment by means of any wall or the like.

When the car engine is running and refrigeration is required the clutch 42 will be engaged so as to drive the compressor and thereby cause refrigeration of the air flowing over the evaporator as well as refrigeration of the water pumped through the coil 20 by the auxiliary pump 50. This refrigerated water is circulated through the air contacting coil 16 and then returns to the coil 20 where it gives up the heat removed from the air. As explained hereinabove, the valve 52 will be closed at such times when refrigeration is required and consequently it is impossible for the refrigerated water circulated by the auxiliary pump 50 to intermingle with the hot water being circulated by the main water pump 30. When the temperature in the passenger compartment falls below the temperature at which the valve 52 opens, the thermostat 48 will have shut off the compressor and the auxiliary water pump.

The conditioned air leaving the unit 18 is adapted to be distributed into the passenger compartment through an air duct system of the general type now being used on many automobiles and more fully shown and described in copending application Serial No. 395,485, filed December 1, 1953.

The unit 18 is provided with a first damper 100 (see Figure 2) through which a portion of the conditioned air may be discharged into the lower portion of the passenger compartment. A special air distributing duct 102 is used for discharging a portion of the conditioned air upwardly to a point adjacent the base of the car windshield 104.

The duct 102 shown in the drawing is intended to represent the duct work of the general type now used in many modern cars for conveying heated air to a point adjacent the bottom edge of the windshield for defrosting the same. While it is not practical to use the convention defrost air outlet for discharging refrigerated air during the cooling cycle, it has been found that the main duct work can conveniently be used for discharging refrigerated air into the front part of the passenger compartment by providing suitable air deflecting means in the outlet of the duct.

Referring now to Figures 3 and 4 of the drawing, wherein a preferred form of this air deflecting means has been shown, reference numeral 106 designates the elongated throat or air distributing slot which is arranged adjacent the base of the windshield. A single air deflecting baffle 108 is pivotally mounted in the slot 106 for selectively directing the air either against the windshield for defrosting purposes when the air is being heated or away from the windshield when the air is being cooled.

An air deflecting hood 110 is mounted as shown in Figure 3 and cooperates with the air deflecting baffle 108 to direct the air away from the windshield and to shield the main outlet slot. When the air deflecting baffle 108 occupies the position in which it is shown in solid lines in Figure 3, substantially all of the air follows the path of the solid line arrows with the result that the air sweeps rearwardly through the upper portion of the passenger compartment. When the damper occupies the position in which it is shown in dot-dash lines, all of the air will be directed upwardly against the windshield. The air deflecting baffle 108 would be used in the solid line position during the cooling season and at times during the heating season. When defrosting is required, it would always be moved into the dot-dash position. In order to simplify the disclosure only the one duct section 102 has been shown in the drawing, whereas two or more of these ducts would preferably be used so as to provide substantially uniform distribution of air along the entire base of the windshield.

While the form of embodiment of the invention as herein disclosed constitutes a preferred form, it is to be understood that other forms might be adopted, as may come within the scope of the claims which follow.

What is claimed is as follows:

1. In combination with a vehicle having a passenger compartment and an engine compartment, an engine within said engine compartment for propelling said vehicle, a windshield forming a portion of the front wall of said passenger compartment, a compressor, means for transmitting power from said engine to said compressor, a condenser, an evaporator, and refrigerant flow connections between said compressor, condenser, and evaporator, means for circulating air for said passenger compartment in thermal exchange relationship with said evaporator, an auxiliary air cooling unit for cooling air for one portion of said passenger compartment, means for circulating a heat transfer liquid between said evaporator and said auxiliary air cooling unit, duct means for directing the air cooled by said evaporator into the forward portion of said passenger compartment, and air directing baffle means at the outlet of said duct means operable to selectively direct the outgoing air either onto said windshield or rearwardly away from the lower edge of said windshield.

2. In combination with a vehicle having a passenger compartment and an engine compartment, an engine within said engine compartment for propelling said vehicle, a windshield forming a portion of the front wall of said passenger compartment, a compressor, means for transmitting power from said engine to said compressor, a condenser, an evaporator, and refrigerant flow connections between said compressor, condenser, and evaporator, means for circulating air for said passenger compartment in thermal exchange relationship with said evaporator, duct means having an elongated air outlet slot adjacent the base of said windshield for directing the air cooled by said evaporator into the forward portion of said passenger compartment, and air directing baffle means at the outlet of said duct means operable to selectively direct the outgoing air either onto said windshield or rearwardly away from the lower edge of said windshield.

3. In combination with a vehicle having a passenger compartment and an engine compartment, an engine within said engine compartment for propelling said vehicle, a windshield forming a portion of the front wall of said passenger compartment, a compressor, means for transmitting power from said engine to said compressor, a condenser, an evaporator, and refrigerant flow connections between said compressor, condenser, and evaporator, means for circulating air for said passenger compartment in thermal exchange relationship with said evaporator, an auxiliary air cooling unit for cooling air for one portion of said passenger compartment, means for circulating a heat transfer liquid between said evaporator and said auxiliary air cooling unit, duct means for directing the air cooled by said evaporator into the forward portion of said passenger compartment, said duct means terminating in an elongated air outlet slot, and air directing baffle means pivotally supported within said outlet slot and operable to selectively direct the outgoing air either onto said windshield or rearwardly away from the lower edge of said windshield.

4. In combination with a vehicle having a passenger compartment provided with a windshield and having an engine compartment separated from said passenger compartment by a wall, an engine within said engine compartment for propelling said vehicle, a compressor, means for transmitting power from said engine to said compressor, a condenser, an evaporator, and refrigerant flow connections between said compressor, condenser, and evaporator, means for circulating air for said passenger compartment into thermal exchange relationship with said evaporator, duct means for conveying said air to a point adjacent the lower edge of said windshield, an air directing vane located in the outlet of said duct for selectively directing the air either upwardly into contact with said windshield or rearwardly in spaced relationship to said windshield.

5. In combination with a vehicle having a passenger compartment provided with a windshield, an air conditioning casing having air inlet means communicating with said passenger compartment and with the outside atmosphere, air circulating and conditioning apparatus including means for cooling air flowing through said casing, and means for conveying the air leaving said casing to a point adjacent the lower edge of said windshield, said last named means having an elongated air outlet slot arranged adjacent the lower edge of said windshield, and a single air directing damper disposed within said slot and operable to selectively direct the air either upwardly into contact with said windshield or angularly away from the windshield in a rearward direction.

6. In combination with a vehicle having a passenger compartment provided with a windshield, air conditioning apparatus including air circulating means and means for cooling the air thus circulated whenever cooling is required, means for conveying said air to a point adjacent the lower edge of said windshield, said means having an elongated air outlet slot arranged adjacent the lower edge of said windshield, a single air directing damper disposed within said slot and operable to selectively direct the air either upwardly into contact with said windshield or angularly away from the windshield in a rearward direction, and a thermostat responsive to the temperature in said passenger compartment for controlling the cooling of said air.

7. In an air conditioning system for an automobile having a passenger compartment and an engine compartment comprising in combination; a refrigerating system including an evaporator, a compressor, and a condenser; a secondary fluid circulating system including first and second spaced apart heat exchange means; a housing enclosing said evaporator and said second heat exchange means; said evaporator and second heat exchange means being located in thermal exchange relationship; and means for circulating air to be conditioned through said housing in thermal exchange relationship with said evaporator and with said second heat exchange means.

References Cited in the file of this patent

UNITED STATES PATENTS

| | | |
|---|---|---|
| 1,767,446 | Graham | June 24, 1930 |
| 1,943,967 | Hulse | Jan. 16, 1934 |
| 2,070,379 | Stramaglia | Feb. 9, 1937 |
| 2,106,515 | Wanamaker | Jan. 25, 1938 |
| 2,264,848 | Kahl | Dec. 2, 1941 |
| 2,388,210 | Hanson et al. | Oct. 30, 1945 |
| 2,667,045 | McCarty | Jan. 26, 1954 |